United States Patent
Wang

(10) Patent No.: US 8,825,797 B2
(45) Date of Patent: Sep. 2, 2014

(54) METHOD AND SYSTEM FOR PROVIDING USER SERVICE DATA

(75) Inventor: Wei Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 417 days.

(21) Appl. No.: 13/257,942

(22) PCT Filed: Mar. 10, 2010

(86) PCT No.: PCT/CN2010/070956
§ 371 (c)(1),
(2), (4) Date: Dec. 8, 2011

(87) PCT Pub. No.: WO2010/145224
PCT Pub. Date: Dec. 23, 2010

(65) Prior Publication Data
US 2012/0079068 A1 Mar. 29, 2012

(30) Foreign Application Priority Data
Jun. 17, 2009 (CN) .......................... 2009 1 0087062

(51) Int. Cl.
*G06F 15/16* (2006.01)
*H04W 4/18* (2009.01)
*H04W 8/20* (2009.01)

(52) U.S. Cl.
CPC . *H04W 8/20* (2013.01); *H04W 4/18* (2013.01)
USPC ....................................... 709/217

(58) Field of Classification Search
None
See application file for complete search history.

(56) References Cited

U.S. PATENT DOCUMENTS

| | | | | |
|---|---|---|---|---|
| 6,026,433 | A | * | 2/2000 | D'Arlach et al. ............ 709/217 |
| 6,466,937 | B1 | * | 10/2002 | Fascenda ...................... 707/622 |
| 6,560,604 | B1 | * | 5/2003 | Fascenda ............................. 1/1 |
| 6,976,081 | B2 | * | 12/2005 | Worger et al. ................ 709/230 |
| 7,042,851 | B1 | | 5/2006 | Rahman et al. |
| 7,117,195 | B2 | * | 10/2006 | Chantrain et al. ............ 709/221 |
| 7,120,703 | B2 | * | 10/2006 | Li et al. ......................... 709/246 |
| 7,284,271 | B2 | * | 10/2007 | Lucovsky et al. ............... 726/21 |
| 7,600,218 | B2 | * | 10/2009 | Yamamoto et al. ........... 717/121 |
| 2002/0010764 | A1 | * | 1/2002 | Spicer .......................... 709/220 |
| 2002/0065884 | A1 | * | 5/2002 | Donoho et al. ............... 709/204 |
| 2002/0184521 | A1 | * | 12/2002 | Lucovsky et al. ............. 713/200 |

(Continued)

FOREIGN PATENT DOCUMENTS

| | | |
|---|---|---|
| CN | 101021916 A | 8/2007 |
| CN | 101127776 A | 2/2008 |
| CN | 101188625 A | 5/2008 |
| CN | 101201815 A | 6/2008 |

OTHER PUBLICATIONS

International Search Report in international application number: PCT/CN2010/070956, mailed on Jun. 17, 2010.

(Continued)

*Primary Examiner* — Brian P Whipple
(74) *Attorney, Agent, or Firm* — Oppedahl Patent Law Firm LLC

(57) ABSTRACT

A method and system for providing user service data. A data processing unit receives a user service data request containing a data request condition and template information, determines a user service data template according to the template information, queries a user service data matching the data request condition from a data storing unit, and generates the user service data matching the determined user service data template from the user service data matching the data request condition.

26 Claims, 4 Drawing Sheets

(56) References Cited

U.S. PATENT DOCUMENTS

| | | | | |
|---|---|---|---|---|
| 2002/0194323 | A1* | 12/2002 | Chantrain et al. | 709/223 |
| 2003/0033356 | A1* | 2/2003 | Tran et al. | 709/203 |
| 2003/0046291 | A1* | 3/2003 | Fascenda | 707/10 |
| 2003/0046420 | A1* | 3/2003 | Breiter et al. | 709/237 |
| 2003/0145115 | A1* | 7/2003 | Worger et al. | 709/247 |
| 2004/0127215 | A1* | 7/2004 | Shaw | 455/432.1 |
| 2005/0144557 | A1* | 6/2005 | Li et al. | 715/513 |
| 2008/0148143 | A1 | 6/2008 | Lee et al. | |

OTHER PUBLICATIONS

English Translation of the Written Opinion of the International Search Authority in international application number: PCT/CN2010/070956, mailed on Jun. 17, 2010.

* cited by examiner

METHOD AND SYSTEM FOR PROVIDING USER SERVICE DATA

TECHNICAL FIELD

The present invention relates to a value-added service technology in communication, particularly to a method and system for providing user service data.

BACKGROUND

Along with the continuous development of mobile communication technology, various mobile value-added services emerge endlessly, such as: Short Messaging Service (SMS), Multimedia Messaging Service (MMS), stream media, Ring-Back Tone (RBT) and the like. When users use these services, lots of user data relating to the services, i.e., user service data are generated. For example, a user need to subscribe corresponding services before use these services, so subscription relationship data are generated. For another example, a user need to set configuration parameters relating to services when use these services, so service configuration data are generated.

Along with the continuous development of the mobile communication technology, new services, new systems and new devices keep emerging and various service systems are interconnected, which call for the continuous increase of user service data systems and devices. However, at present, no specific realization solution for providing user service data is available, which is an urgent problem to be solved.

SUMMARY

For this reason, the main object of the present invention is to provide a method and system for providing user service data, which can save network resources.

in order to achieve the foregoing object, the technical solution of the present invention is implemented in the following ways:

a method for providing user service data comprises:

receiving a user service data request, wherein the user service data request at least contains a data request condition and template information;

determining a corresponding user service data template according to a template identifier when the template information contains a template identifier and contains no template content and format information, and generating a user service data list matching the user service data template from the user service data matching the data request condition.

this method further comprises: when the template information at least contains template content and format information, determining the type and format of the user service data in the user service data template according to the template content and format information, and generating a user service data list matching the user service data template from the user service data matching the data request condition.

When the template information at least contains template content and format information, if the template information further contains a template identifier, after the reception of a user service data request, further comprises: setting the template identifier as the template identifier of the user service data template, and storing the user service data template and a corresponding template identifier;

if the template information contains no template identifier, after the reception of a user service data request, further comprises: determining corresponding template identifier for the user service data template, and storing the user service data template and the corresponding template identifier.

This method further comprises:

receiving a template setting request at least contains template content and format information;

determining the type and format of the user service data in the user service data template according to the template content and format information;

setting the template identifier that the template setting request further contains as correspond to the user service data template, or determining a corresponding template identifier for the user service data template; and storing the user service data template and a corresponding template identifier.

In the foregoing method, after the type and format of the user service data in the user service data template are determined, further comprises: generating a corresponding query instruction according to the types of the user service data in the user service data template and storing it; and the determination of the user service data matching the data request condition comprises: a query instruction for the types of each user service data in the user service data template is determined, and the user service data matching the data request condition is queried through the query instruction.

In the foregoing method, the user service data request comes from a data requestor;

after the generation of the user service data, further comprises: providing the data requestor with a user service data list matching the data request condition and the user service data template; and/or, this method further comprises: providing the data requestor with a template identifier corresponding to the user service data template, or a user service data template and a corresponding template identifier.

A system for providing user service data, which comprises: a data processing unit and a data storing unit, wherein the data processing unit is configured to receive a user service data request at least contains a data request condition and template information, query the user service data matching the data request condition from the data storing unit, and generate a user service data list matching the user service data template from the user service data matching the data request condition, when the template information contains a template identifier and contains no template content and format information, the data processing unit is further configured to determine a corresponding user service data template according to the template identifier, when the template information at least contains template content and format information, the data processing unit is further configured to determine the type and format of the user service data in the user service data template according to the template content and format information; and the data storing unit is configured to store user service data.

when the template information at least contains template content and format information, if the template information further contains a template identifier, the data processing unit is further configured to: set the template identifier as a template identifier of the user service data template, and store the user service data template and a corresponding template identifier;

if the template information contains no template identifier, the data processing unit is further configured to: determine a corresponding template identifier for the user service data template, and store the user service data template and the corresponding template identifier.

In the foregoing system, the data processing unit is further configured to: receive a template setting request at least contains template content and format information; determine the type and format of the user service data in the user service data template according to the template content and format information; set the template identifier that the template setting request further contains as correspond to the user service data template, or determine a corresponding template identifier for the user service data template; and store the user service data template and the corresponding template identifier.

In the foregoing system, after determining the type and format of the user service data in the user service data template, the data processing unit is further configured to: generate a corresponding query instruction according to the types of the user service data in the user service data template and store it; and the data processing unit is configured to determine the user service data matching the data request condition, specifically comprising: determine a query instruction for the types of each user service data in the determined user service data template, and query the user service data matching the data request condition from the data storing unit through the query instruction.

The system further comprises: a data requestor;

after generating user service data, the data processing unit is further configured to: provide the data requestor with a user service data list matching the data request condition and the user service data template; and/or, the data processing unit is further configured to: provide the data requestor with a template identifier corresponding to the user service data template, or a user service data template and a corresponding template identifier.

In the foregoing system, the data processing unit comprises: a data interface module, an analytical processing module, a template management module, a data query module and a result output module, wherein, the data interface module is configured to receive a user service data request, judge whether this user service data request contains template content and format information, and provide the analytical processing module with the template content and format information in the user service data request if so or provide the template management module with the template identifier in the user service data request if not; and is also configured to provide the data query module with a data request condition;

the analytical processing module is configured to determine the type and format of the user service data in the user service data template according to the template content and format information, determine the template identifier that the user service data template corresponds to, generate a corresponding query instruction according to the types of the user service data in the user service data template, and provide the template management module with the user service data template and a corresponding template identifier as well as the query instruction that the types of each user service data in the user service data template correspond to; the template management module stores the user service data template and the corresponding template identifier as well as the query instruction that the types of each user service data in the user service data template correspond to;

the template management module is configured to store a user service data template and a corresponding template identifier as well as the query instruction that the types of each user service data in the user service data template correspond to; and is also configured to determine the query instruction that the types of each user service data in the user service data template correspond to, and provide it for the data query module, and provide the user service data template for the result output module;

the data query module is configured to query the user service data matching the data request condition from the data storing unit through the query instruction corresponding to the types of each user service data in the user service data template; and the result output module is configured to generate a user service data list matching the user service data template from the queried user service data.

A method for providing user service data, which comprises:

receiving a user service data request, wherein the user service data request at least contains a data request condition and template information;

determining the type and format of the user service data in a user service data template according to the template content and format information when the template information at least contains template content and format information, and generating a user service data list matching the user service data template from the user service data matching the data request condition.

In the foregoing method, If the template information further contains a template identifier, after the reception of a user service data request, further comprises: setting the template identifier as the template identifier of the user service data template, and storing the user service data template and a corresponding template identifier;

if the template information contains no template identifier, after the reception of a user service data request, further comprises: determining corresponding template identifier for the user service data template, and storing the user service data template and the corresponding template identifier.

In the foregoing method, after the type and format of the user service data in the user service data template are determined, further comprises: generating a corresponding query instruction according to the types of the user service data in the user service data template and storing it; and the determination of the user service data matching the data request condition comprises: a query instruction for the types of each user service data in the user service data template is determined, and the user service data matching the data request condition is queried through the query instruction.

In the foregoing method, the user service data request comes from a data requestor;

after the generation of the user service data, further comprises: providing the data requestor with a user service data list matching the data request condition and the user service data template; and/or, this method further comprises: providing the data requestor with a template identifier corresponding to the user service data template, or a user service data template and a corresponding template identifier.

In the solution of the present invention, the user service data template can be preset, and for the new template content and format information while requesting the user service data, the corresponding user service data template can be generated directly and stored for later use, so that the pre-process to the user service data template is implemented actually and an existing user service data template is reusable. In order to request the user service data based on the user service data template which is already set, it is only needed to provide a template identifier to the data processing unit, but not needed to provide the template content and format information of the user service data template, thereby reducing the number of bytes of a message requesting the user service data, avoiding the excessive occupancy of transport resources and reducing the occupancy of the network resources.

Further, in the solution of the present invention, when setting a user service data template, the corresponding query instruction may be generated directly and stored. In this way, the query instruction needs to be generated only once for the same user service data template, thereby avoiding subsequent repeated generation of the query instruction, decreasing processing load, reducing resource occupancy, and significantly increasing the processing speed and response speed.

DETAILED DESCRIPTION

As the user service data needed by different systems and devices are diversified, when user service data are provided to meet a user service data request, it may be realized based on a user service data template, so as to adapt to the different demands and changes of different systems and devices. The user service data template is used for representing the type of provided user service data and the format which is to be complied with.

Figure 1:
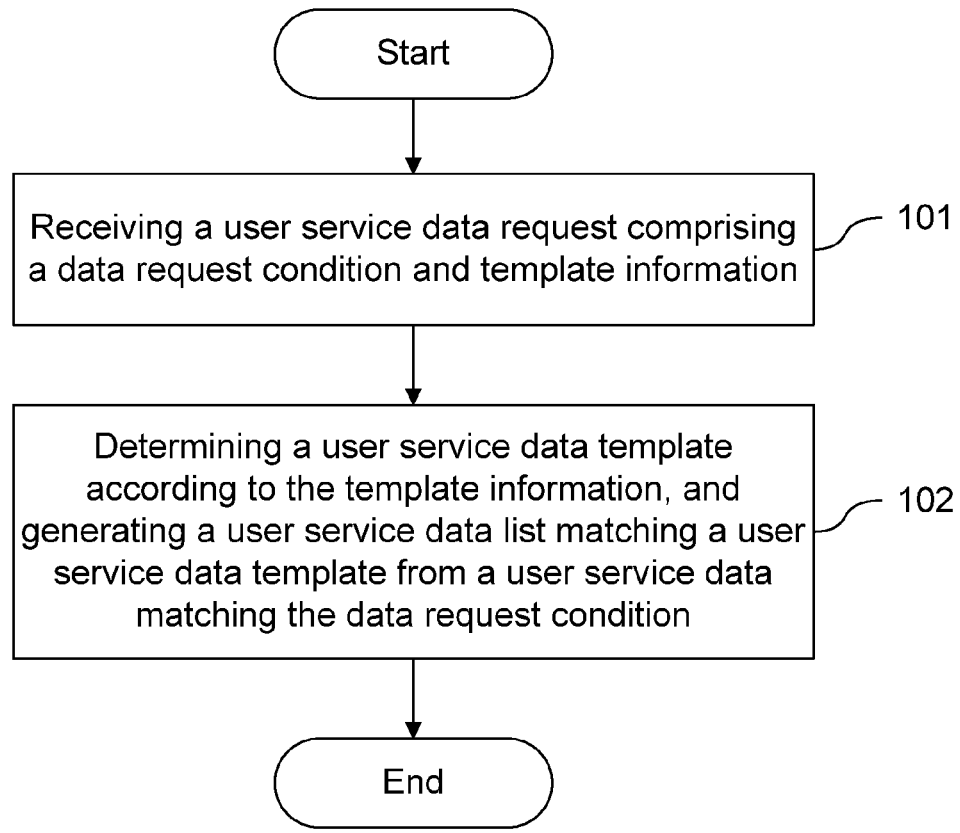
FIG. 1 shows a schematic of the flow for providing user service data in the present invention.

FIG. 1 shows a schematic of the flow for providing user service data in the present invention. As shown in FIG. 1, the processing procedure for providing user service data comprises:

step 101: A user service data request is received, which contains a data request condition and template information. Wherein the data request condition is used for representing the needed user service data under a specific condition. The template information is the information relating to the user service data template and may be a template identifier, which is used for solely identifying the user service data template which is already set; or may be template content and format information, which is used for representing the types of the user service data in the user service data template, and the formats that the specific user service data among all types of user service data shall comply with. The types of user service data may comprise: subscription type (subtype), subscriber ID (subscriberID), service ID (serviceID) and the like. The user service data template may be represented through template content and format information.

Step 102: A user service data template is determined according to the template information in the user service data request. The user service data matching the data request condition is determined. A user service data list matching the determined user service data template is generated from the user service data matching the data request condition.

When the template information contains a template identifier and contains no template content and format information, the user service data template is determined according to the template information, specifically: the corresponding user service data template is directly determined according to the template identifier; when the template information at least contains template content and format information, the user service data template is determined according to template information, specifically: the type and format of the user service data in the user service data template are determined according to template content and format information. On the basis of containing template content and format information, the template information may further contain a template identifier. The template identifier is set as the template identifier of the corresponding user service data template. If the template information only contains template content and format information but template identifier, a template identifier needs to be determined for the corresponding user service data template. It can be determined by means of judging processing whether template information contains template content and format information.

The flow as shown in FIG. 1 is described below through FIG. 2A, FIG. 2B and FIG. 2C in detail.

Figure 2A:
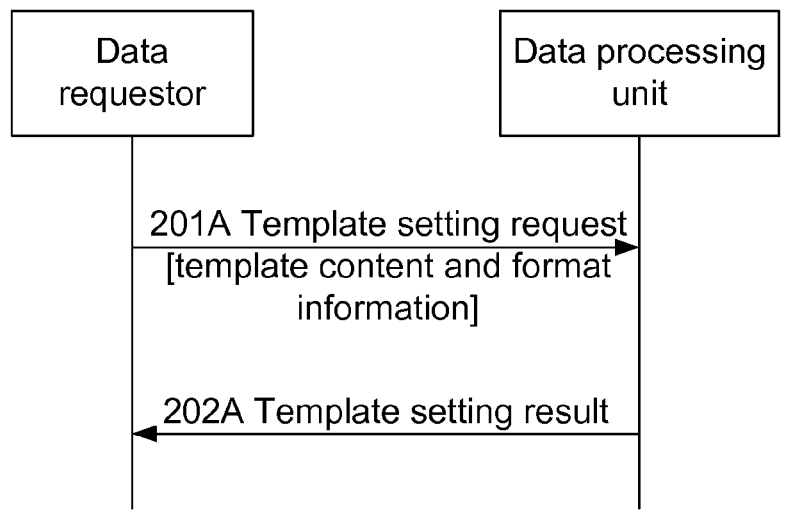
FIG. 2A shows a schematic of the signaling interaction for setting a user service data template in the present invention.

FIG. 2A shows a schematic of the signaling interaction for setting a user service data template in the present invention. As shown in FIG. 2A, the processing procedure for setting a user service data template comprises:

step 201A: The data requestor sends the data processing unit a template setting request, which contains template content and format information, to request the data processing unit to set a needed user service data template. The template content and format information are used for representing the types of the user service data in the user service data template, and the formats that the specific user service data among all types of user service data shall comply with.

Step 202A: After receiving the template setting request, the data processing unit determines the type and format of the user service data in the user service data template according to the template content and format information in the template setting request, and determines the template identifier that the user service data template corresponds to; and stores the user service data template and the corresponding template identifier. The data processing unit sends a template setting result to the data requestor, to inform the data requestor whether the setting of the user service data template is successful.

The template identifier may be a character string consisting of a string of characters, or a series of digits, or the combination of characters and digits, as long as it can solely identify a user service data template. The template identifier may be set by a data requestor, then the template setting request in step 201A further contains a template identifier, so as to inform the data processing unit of the template identifier of the corresponding user service data template. In step 202A, determining the template identifier that the user service data template corresponds to, comprises: the template identifier that the template setting request further contains is set as correspond to the corresponding user service data template. The template identifier may be also set by the data processing unit, then In step 202A, determining the template identifier that the user service data template corresponds to, comprises: the corresponding template identifier is determined for the user service data template. The template setting result in step 202A further contains the template identifier that the user service data template corresponds to.

The types of the user service data which may be contained in the user service data template comprise but are not limited to any of the following types or any combination of them: subscription type (subertype), subscriber ID (subscriberID), user type (usertype), user ID (userID), service ID (serviceID), subscription relationship status (status), subscription time (subscriptiontime), active time of subscription relationship (activetime), and etc. If the template content information in the template setting request comprises: subscriberID, userID, serviceID, status an activetime, then the specific form of the user service data template may be:

suberID:"{subscriberID}", userID:"{userID}", serviceID:"{serviceID}", status:{status}, activetime:{activetime,YYYY.MM.DD HH:MM:SS}, wherein, {XXX} or {XXX, ZZZZ} represents type of the user service data contained by corresponding user service data in the user service data template; XXX represents the name of the type of a user service data and ZZZZ represents the format that the user service data of this type shall comply with.

The above is an example for the concrete content of a user service data template and does not indicate there is only the foregoing implementation way.

With regard to a user service data template which is already set, the data processing unit may provide the user service data template which is already set and the corresponding template identifier for a data requestor or a plurality of data requestors. In this case, if the data requestor requests for user service data based on the user service data template which is already set, only a template identifier is needed to be provided for the data processing unit, while no need to provide the template content and format information of the user service data template, in order to avoid excessive occupancy of transport resources. The data requestor mentioned here may be the same as or different from the data requestor in FIG. 2A and refers to any data requestor which can request for user service data from the data processing unit.

Figure 2B:
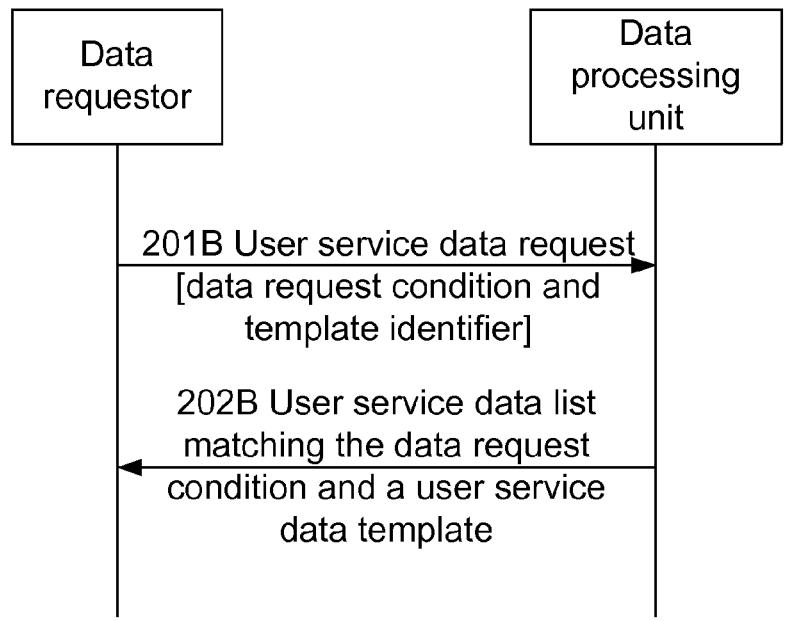
FIG. 2B shows a schematic of the signaling interaction for providing user service data based on a template identifier in the present invention.

FIG. 2B is a schematic of the signaling interaction for providing user service data based on a template identifier in the present invention. As shown in FIG. 2B, the processing procedure for providing user service data based on a template identifier comprises:

step 201B: a data requestor sends a data processing unit a user service data request, which contains a data request condition and a template identifier, to request the data processing unit to provide the user service data matching the data request condition and currently needed format. The data request condition comprises: subscriberID, userID, serviceID etc. The currently needed format refers to the user service data template corresponding to the template identifier.

step 202B: After receiving a user service data request, the data processing unit determines the corresponding user service data template according to the template identifier in the user service data request, queries the user service data matching the data request condition in the user service data request from a data storing unit, and generates a user service data list matching the determined user service data template from the user service data matching the data request condition. The data processing unit returns a user service data list matching the determined user service data template to the data requestor. This user service data list refers to the user service data that the data requestor need, which meets the requirement of the data requestor, i.e., the data request condition, and conforms to the format of the user service data that the data requestor need, i.e., the user service data template corresponding to the template identifier.

The data requestor in FIG. 2A may be the same as or different from the data requestor in FIG. 2B.

Figure 2C:
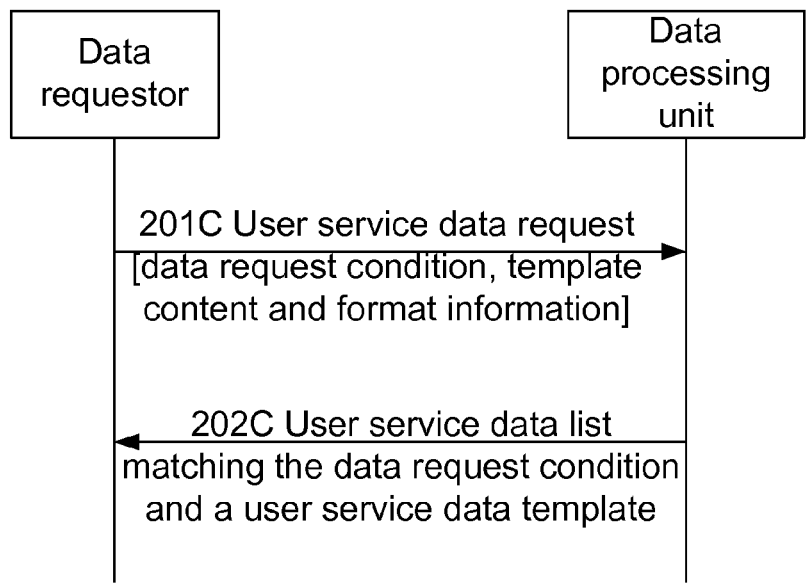
FIG. 2C shows a schematic of the signaling interaction for providing user service data based on template content and format information in the present invention.

FIG. 2C is a schematic of the signaling interaction for providing user service data based on template content and format information in the present invention. As shown in FIG. 2C, the processing procedure for providing user service data based on template content and format information comprises:

step 201C: a data requestor sends a data processing unit a user service data request, which contains a data request condition, template content and format information, to request the data processing unit to provide a user service data list matching the data request condition and a currently needed user service data template. The data request condition comprises: subscribed D, userID, serviceID etc.

step 202C: After receiving a user service data request, the data processing unit determines the type and format of the user service data in the user service data template according to the template content and format information in the user service data request, and determines the template identifier that the user service data template corresponds to; and stores the user service data template and the corresponding template identifier. The data processing unit queries the user service data matching the data request condition in the user service data request from a data storing unit, and generates a user service data list matching the determined user service data template from the user service data matching the data request condition. The data processing unit returns the user service data matching the determined user service data template to the data requestor. This user service data is the user service data that the data requestor need, which meets the requirements of the data requestor, i.e., the data request condition, and conforms to the format of the user service data that the data requestor need, i.e., the user service data template that the data requestor need.

The template identifier may be set by the data requestor, then the user service data request in step 201C further contains a template identifier, to inform the data processing unit of the template identifier of the corresponding user service data template. In step 202C, determining the template identifier that the user service data template corresponds to, comprises: the template identifier in the user service data request is set as correspond to the user service data template, and the template identifier may also be set by the data processing unit, then in step 202C, determining the template identifier that the user service data template corresponds to, comprises: the corresponding template identifier is determined for the user service data template. Step 202C further comprises: the data processing unit provides the data requestor with the template identifier that the user service data template corresponds to, so that when the data requestor requests for user service data based on the same user service data template in the future, only a template identifier is needed to be provided for the data processing unit.

With regard to a newly set user service data template, the data processing unit may provide the newly set user service data template and the corresponding template identifier for a data requestor or a plurality of data requestors. The data requestor here refers to any data requestor which can request for user service data from the data processing unit.

Further, user service data refer to various user data relating to service, such as: subscription relationship, user service status, user service configuration information and the like, so the storing ways of different types of user service data may not be the same, such as: database, Web server and the like; accordingly, the data storing unit may be the set of data storing sub-units which are distributed in a communication network and store different types of user service data. The difference of storing ways to different types of user service data, will make the access mode of the data storing sub-units which store different types of user service data different. The user service data corresponding to a determined type have determined storing way, so that the data storing sub-units storing this type of user service data as well as corresponding access mode is determined.

Thus, If storing ways of different types of user service data are different, when setting a user service data template, the data processing unit further need to generate a corresponding query instruction according to the types of the user service data in the user service data template, and store the corresponding query instruction. In this case, the data processing unit stores a user service data template and a corresponding template identifier and the query instruction that the types of each user service data in the user service data template correspond to. For same user service data templates, the data processing unit only generates the query instruction once, thereby avoiding repeated generation of the query instruction after receiving user service data request subsequently, decreasing processing load of the data processing unit, reducing resource occupancy on the data processing unit, and significantly increasing the processing speed of the data processing unit and the response speed of the data processing unit.

After receiving a user service data request, the data processing unit determines the query instruction that the types of each user service data in the user service data template correspond to, and queries the user service data matching the data request condition from the data storing unit through the query instruction, for example, if the types of user service data in the user service data template are userID, serviceID and activetime, the data processing unit will generate a query instruction 1 corresponding to userID, a query instruction 2 corresponding to serviceID, and a query instruction 3 corresponding to activetime; after receiving a user service data request, the data processing unit will query concrete useID from the data storing unit through the query instruction 1, query concrete serviceID from the data storing unit through the query instruction 2, and query the concrete activetime from the data storing unit through the query instruction 3.

Figure 3:
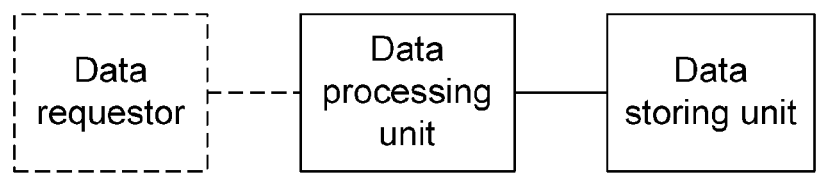
FIG. 3 shows a structural schematic of the system for providing user service data in the present invention.

FIG. 3 shows a structural schematic of the system for providing user service data in the present invention. As shown in FIG. 3, this system comprises: a data processing unit and a data storing unit, wherein the data processing unit is configured to receive a user service data request, determine a user service data template according to the template information in the user service data request, query the user service data matching the data request condition in the user service data request from the data storing unit, and generate a user service data list matching the determined user service data template from the user service data matching the data request condition; the data storing unit is configured to store user service data. The data storing unit is the owner of user service data and may be a database, a Web service, an external system (such as an operation support system or an integrated service management platform) and etc.

When the template information contains a template identifier and contains no template content and format information, the data processing unit is specifically configured to determine a user service data template corresponding to the template identifier, query the user service data matching data request condition in the user service data request from the data storing unit, and generate a user service data list matching the determined user service data template from the user service data matching the data request condition.

When the template information at least contains template content and format information, the data processing unit is specifically configured to determine the type and format of the user service data in the user service data template according to the template content and format information, query the user service data matching the data request condition in the user service data request from the data storing unit, and generate a user service data list matching the corresponding user service data template from the user service data matching the data request condition.

Whether template information contains template content and format information may be determined by means of judgment by the data processing unit.

This system further comprises: a data requestor. The data processing unit is further configured to provide the data requestor with a user service data list matching the requested data request condition and user service data template. The data processing unit may be further configured to provide the data requestor with a template identifier corresponding to a user service data template or a user service data template and a corresponding template identifier. The data processing unit may be further configured to receive a template setting request sent by the data requestor, determine the type and format of the user service data in the user service data template according to the template content and format information in the template setting request, and determine the template identifier that the user service data template corresponds to. This template identifier may be set by the data processing unit, or may be set and provided by the data requestor.

When the template identifier is set by the data processing unit, the data processing unit is further configured to determine the corresponding template identifier for the user service data template and store the user service data template and the corresponding template identifier. When the template identifier is set by the data requestor, the data processing unit is further configured to set the received template identifier as the template identifier of the user service data template and store the user service data template and the corresponding template identifier.

After determining the type and format of the user service data in the user service data template, the data processing unit is further configured to generate a corresponding query instruction according to the types of the user service data in the user service data template and store it; the data processing unit is configured to query the user service data matching the data request condition from the data storing unit, specifically comprises: determine the query instruction that the types of each user service data in the user service data template correspond to, and query the user service data matching the data request condition from the data storing unit through the query instruction.

Figure 4:
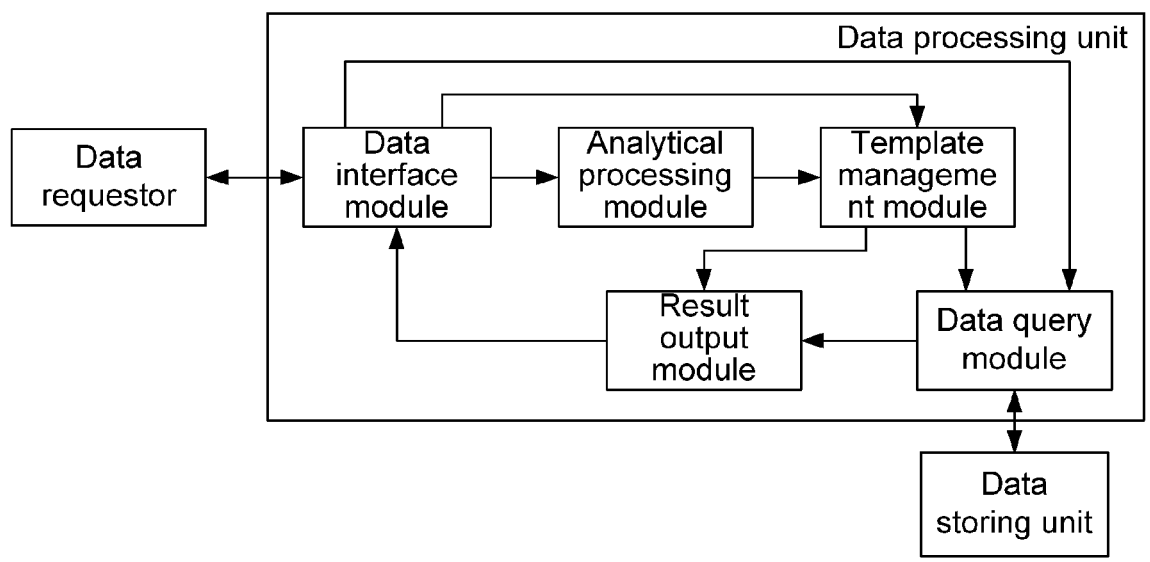
FIG. 4 shows a structural schematic of a data processing unit in the present invention.

FIG. 4 shows a structural schematic of a data processing unit in the present invention. As shown in FIG. 4, the data processing unit may specifically comprise: a data interface module, an analytical processing module, a template management module, a data query module and a result output module, wherein, the data interface module is configured to receive a user service data request sent by a data requestor, judge whether this user service data request contains template content and format information, and provide the analytical processing module with the template content and format information in the user service data request if so or provide the template management module with the template identifier in the user service data request if not; and is further configured to provide the data query module with a data request condition, and return the user service data list provided by the result output module which matching the data request condition and currently needed user service data template to the data requestor;

the analytical processing module is configured to determine the type and format of the user service data in the user service data template according to the template content and format information, determine the template identifier that the user service data template corresponds to, generate the corresponding query instruction according to the types of the user service data in the user service data template, and provide the template management module with the user service data template and the corresponding template identifier as well as the query instruction that the types of each user service data in the user service data template correspond to. The template management module stores the user service data template and a corresponding template identifier as well as the query instruction that the types of each user service data in the user service data template correspond to. The template identifier may be set by the analytical processing module or the data requestor. When it is set by the data requestor, the user service data request sent by the data requestor further contains a template identifier;

the template management module is configured to store a user service data template and a corresponding template identifier as well as the query instruction that the types of each user service data in the user service data template correspond to; and is further configured to determine the query instruction that the types of each user service data in the user service data template correspond to, provide it for the data query module, and provide currently needed user service data template for the result output module. The template management module may specifically determine the currently needed user service data template according to the template identifier provided by the data interface module, or take the user service data template provided by the template management module as the currently needed user service data template;

the data query module is configured to query the user service data matching a data request condition from the data storing unit through the query instruction corresponding to the types of each user service data in the user service data template, and provide the queried user service data for the result output module; and the result output module is configured to generate a user service data list matching currently needed user service data template from the queried user service data, and provide it for the data interface module.

Figure 5:
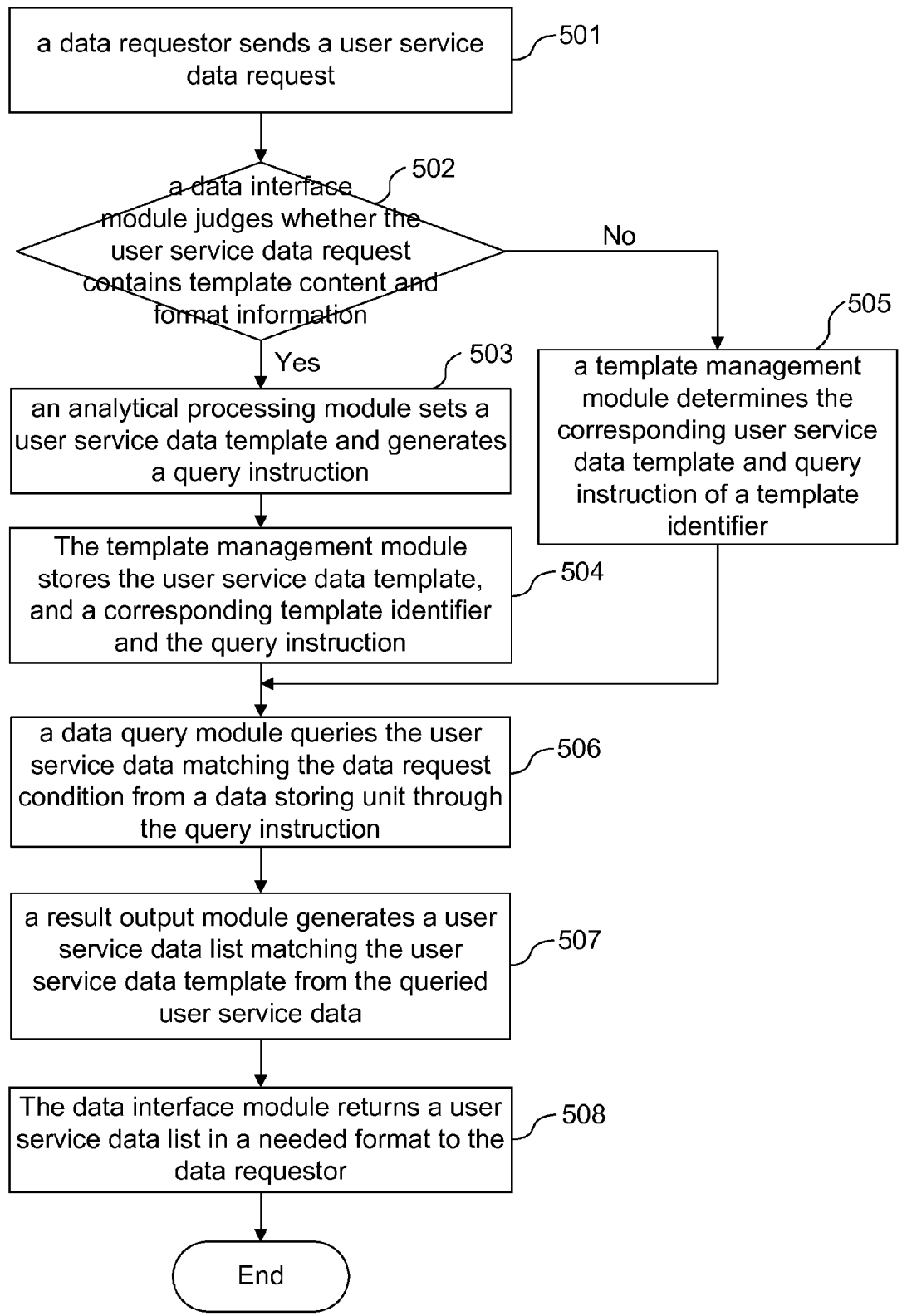
FIG. 5 shows a schematic of the flow of providing user service data by a data processing unit in the present invention.

FIG. 5 shows a schematic of the flow of providing user service data by a data processing unit based on the structure shown in FIG. 4 in the present invention. As shown in FIG. 5, the processing procedure of providing user service data by the data processing unit comprises:

step 501: a data requestor sends a user service data request to the data processing unit.

step 502: The data interface module in the data processing unit receives a user service data request, judges whether this user service data request contains template content and format information, and provides the analytical processing module with the template content and format information in the user service data request and then continues to execute step 503 if so; or provides the template management module with the template identifier in the user service data request and then continues to execute step 505 if not.

step 503: The analytical processing module is configured to determine the type and format of the user service data in the user service data template according to the template content and format information, determine the template identifier that the user service data template corresponds to, generate a corresponding query instruction according to the types of the user service data in the user service data template, and provide the template management module with the user service data template and a corresponding template identifier as well as the query instruction that the types of each user service data in the user service data template correspond to. The template identifier may be set by the analytical processing module or the data requestor. When it is set by the data requestor, the user service data request sent by the data requestor in step 501 further contains a template identifier.

step 504: The template management module stores a user service data template and a corresponding template identifier as well as the query instruction that the types of each user service data in the user service data template correspond to, provides the data query module with query instruction that the types of each user service data in the user service data template correspond to, and provides currently needed user service data template for the result output module, and then continues to execute step 506.

step 505: The template management module determines the query instruction that the types of each user service data in the user service data template correspond to according to the template identifier, provides it for the data query module, and provides currently needed user service data template for the result output module.

step 506: The data query module queries the user service data matching a data request condition from the data storing unit through the query instruction corresponding to the types of each user service data in the user service data template, and provides the queries user service data for the result output module.

step 507: The result output module generates a user service data list matching the currently needed user service data template from the queried user service data and provides it for the data interface module.

step 508: The data interface module returns the user service data list provided by the result output module which matching the data request condition and the currently needed user service data template to the data requestor.

The foregoing data requestor may be a service management portal, a customer service system, a service engine, or else.

The foregoing descriptions are only preferred embodiments of the present invention and are not intended to limit the protection scope of the present invention.

The invention claimed is:

1. A method for providing user service data, comprising:
receiving a user service data request, wherein the user service data request at least contains a data request condition and template information;
determining a corresponding user service data template according to a template identifier when the template information contains a template identifier and contains no template content and format information, and generating a user service data list matching the user service data template from a user service data matching the data request condition.

2. The method according to claim 1, wherein,
the method further comprises: when the template information at least contains template content and format information, determining the type and format of the user service data in the user service data template according to the template content and format information, and generating a user service data list matching the user service data template from the user service data matching the data request condition.

3. The method according to claim 2, wherein when the template information at least contains template content and format information, if the template information further contains a template identifier, after the reception of a user service data request, the method further comprises: setting the template identifier as the template identifier of the user service data template, and storing the user service data template and a corresponding template identifier;

if the template information contains no template identifier, after the reception of a user service data request, the method further comprises: determining corresponding template identifier for the user service data template, and storing the user service data template and the corresponding template identifier.

4. The method according to claim 1, wherein the method further comprises:

receiving a template setting request at least contains template content and format information;

determining the type and format of the user service data in the user service data template according to the template content and format information;

setting the template identifier that the template setting request further contains as correspond to the user service data template, or determining a corresponding template identifier for the user service data template; and storing the user service data template and a corresponding template identifier.

5. The method according to claim 3, wherein, after the type and format of the user service data in the user service data template are determined, the method further comprises: generating and storing a corresponding query instruction according to the types of the user service data in the user service data template; and the determination of the user service data matching the data request condition comprises: a query instruction for the types of each user service data in the user service data template is determined, and the user service data matching the data request condition is queried through the query instruction.

6. The method according to claim 1, wherein, the user service data request comes from a data requestor;

after the generation of the user service data, the method further comprises: providing the data requestor with a user service data list matching the data request condition and the user service data template; and/or, the method further comprises: providing the data requestor with a template identifier corresponding to the user service data template, or a user service data template and a corresponding template identifier.

7. A system for providing user service data, comprising: a data processing unit and a data storing unit, wherein the data processing unit is configured to receive a user service data request at least containing a data request condition and template information, query a user service data matching the data request condition from the data storing unit, and generate a user service data list matching the user service data template from the user service data matching the data request condition, when the template information contains a template identifier and contains no template content and format information, the data processing unit is further configured to determine a corresponding user service data template according to the template identifier, when the template information at least contains template content and format information, the data processing unit is further configured to determine the type and format of the user service data in the user service data template according to the template content and format information; and the data storing unit is configured to store user service data.

8. The system according to claim 7, when the template information at least contains template content and format information, if the template information further contains a template identifier, the data processing unit is further configured to: set the template identifier as a template identifier of the user service data template, and store the user service data template and a corresponding template identifier;

if the template information contains no template identifier, the data processing unit is further configured to: determine a corresponding template identifier for the user service data template, and store the user service data template and the corresponding template identifier.

9. The system according to claim 7, wherein the data processing unit is further configured to: receive a template setting request at least containing template content and format information; determine the type and format of the user service data in the user service data template according to the template content and format information; set the template identifier that the template setting request further contains as correspond to the user service data template, or determine a corresponding template identifier for the user service data template; and store the user service data template and the corresponding template identifier.

10. The system according to claim 8, wherein, after determining the type and format of the user service data in the user service data template, the data processing unit is further configured to: generate and store a corresponding query instruction according to the types of the user service data in the user service data template; and the data processing unit is configured to determine the user service data matching the data request condition, specifically comprising: determine a query instruction for the types of each user service data in the determined user service data template, and query the user service data matching the data request condition from the data storing unit through the query instruction.

11. The system according to claim 7, wherein the system further comprises: a data requestor;

after generating user service data, the data processing unit is further configured to: provide the data requestor with a user service data list matching the data request condition and the user service data template; and/or, the data processing unit is further configured to: provide the data requestor with a template identifier corresponding to the user service data template, or a user service data template and a corresponding template identifier.

12. The system according to claim 10, wherein the data processing unit comprises: a data interface module, an analytical processing module, a template management module, a data query module and a result output module, wherein, the data interface module is configured to receive a user service data request, judge whether this user service data request contains template content and format information, and provide the analytical processing module with the template content and format information in the user service data request if so or provide the template management module with the template identifier in the user service data request if not; and is also configured to provide the data query module with a data request condition;

the analytical processing module is configured to determine the type and format of the user service data in the user service data template according to the template content and format information, determine the template identifier that the user service data template corresponds to, generate a corresponding query instruction according to the types of the user service data in the user service data template, and provide the template management module with the user service data template and a corresponding template identifier as well as the query instruction that the types of each user service data in the user service data template correspond to; the template management module stores the user service data template and the corresponding template identifier as well as the query instruction that the types of each user service data in the user service data template correspond to;

the template management module is configured to store a user service data template and a corresponding template identifier as well as the query instruction that the types of each user service data in the user service data template correspond to; and is also configured to determine the query instruction that the types of each user service data in the user service data template correspond to, and provide it for the data query module, and provide the user service data template for the result output module;

the data query module is configured to query the user service data matching the data request condition from the data storing unit through the query instruction corresponding to the types of each user service data in the user service data template; and the result output module is configured to generate a user service data list matching the user service data template from the queried user service data.

13. A method for providing user service data, comprising:
receiving a user service data request, wherein the user service data request at least contains a data request condition and template information;
determining the type and format of the user service data in a user service data template according to the template content and format information when the template information at least contains template content and format information, and generating a user service data list matching the user service data template from a user service data matching the data request condition.

14. The method according to claim 13, wherein,
if the template information further contains a template identifier, after the reception of a user service data request, the method further comprises: setting the template identifier as the template identifier of the user service data template, and storing the user service data template and a corresponding template identifier;
if the template information contains no template identifier, after the reception of a user service data request, the method further comprises: determining corresponding template identifier for the user service data template, and storing the user service data template and the corresponding template identifier.

15. The method according to claim 13, wherein,
after the type and format of the user service data in the user service data template are determined, the method further comprises: generating and storing a corresponding query instruction according to the types of the user service data in the user service data template; and the determination of the user service data matching the data request condition comprises: a query instruction for the types of each user service data in the user service data template is determined, and the user service data matching the data request condition is queried through the query instruction.

16. The method according to claim 13, wherein,
the user service data request comes from a data requestor;
after the generation of the user service data, the method further comprises: providing the data requestor with a user service data list matching the data request condition and the user service data template; and/or,
the method further comprises: providing the data requestor with a template identifier corresponding to the user service data template, or a user service data template and a corresponding template identifier.

17. The method according to claim 4, wherein,
after the type and format of the user service data in the user service data template are determined, the method further comprises: generating and storing a corresponding query instruction according to the types of the user service data in the user service data template; and the determination of the user service data matching the data request condition comprises: a query instruction for the types of each user service data in the user service data template is determined, and the user service data matching the data request condition is queried through the query instruction.

18. The method according to claim 2, wherein,
the user service data request comes from a data requestor;
after the generation of the user service data, the method further comprises: providing the data requestor with a user service data list matching the data request condition and the user service data template; and/or,
the method further comprises: providing the data requestor with a template identifier corresponding to the user service data template, or a user service data template and a corresponding template identifier.

19. The method according to claim 3, wherein,
the user service data request comes from a data requestor;
after the generation of the user service data, the method further comprises: providing the data requestor with a user service data list matching the data request condition and the user service data template; and/or,
the method further comprises: providing the data requestor with a template identifier corresponding to the user service data template, or a user service data template and a corresponding template identifier.

20. The method according to claim 4, wherein,
the user service data request comes from a data requestor;
after the generation of the user service data, the method further comprises: providing the data requestor with a user service data list matching the data request condition and the user service data template; and/or,
the method further comprises: providing the data requestor with a template identifier corresponding to the user service data template, or a user service data template and a corresponding template identifier.

21. The system according to claim 9, wherein, after determining the type and format of the user service data in the user service data template, the data processing unit is further configured to: generate and store a corresponding query instruction according to the types of the user service data in the user service data template; and the data processing unit is configured to determine the user service data matching the data request condition, specifically comprising: determine a query instruction for the types of each user service data in the determined user service data template, and query the user service data matching the data request condition from the data storing unit through the query instruction.

22. The system according to claim 8, wherein the system further comprises: a data requestor;
   after generating user service data, the data processing unit is further configured to: provide the data requestor with a user service data list matching the data request condition and the user service data template; and/or,
   the data processing unit is further configured to: provide the data requestor with a template identifier corresponding to the user service data template, or a user service data template and a corresponding template identifier.

23. The system according to claim 9, wherein the system further comprises: a data requestor;
   after generating user service data, the data processing unit is further configured to: provide the data requestor with a user service data list matching the data request condition and the user service data template; and/or,
   the data processing unit is further configured to: provide the data requestor with a template identifier corresponding to the user service data template, or a user service data template and a corresponding template identifier.

24. The system according to claim 21, wherein the data processing unit comprises: a data interface module, an analytical processing module, a template management module, a data query module and a result output module, wherein,
   the data interface module is configured to receive a user service data request, judge whether this user service data request contains template content and format information, and provide the analytical processing module with the template content and format information in the user service data request if so or provide the template management module with the template identifier in the user service data request if not; and is also configured to provide the data query module with a data request condition;
   the analytical processing module is configured to determine the type and format of the user service data in the user service data template according to the template content and format information, determine the template identifier that the user service data template corresponds to, generate a corresponding query instruction according to the types of the user service data in the user service data template, and provide the template management module with the user service data template and a corresponding template identifier as well as the query instruction that the types of each user service data in the user service data template correspond to; the template management module stores the user service data template and the corresponding template identifier as well as the query instruction that the types of each user service data in the user service data template correspond to;
   the template management module is configured to store a user service data template and a corresponding template identifier as well as the query instruction that the types of each user service data in the user service data template correspond to; and is also configured to determine the query instruction that the types of each user service data in the user service data template correspond to, and provide it for the data query module, and provide the user service data template for the result output module;
   the data query module is configured to query the user service data matching the data request condition from the data storing unit through the query instruction corresponding to the types of each user service data in the user service data template; and
   the result output module is configured to generate a user service data list matching the user service data template from the queried user service data.

25. The method according to claim 14, wherein,
   after the type and format of the user service data in the user service data template are determined, the method further comprises: generating and storing a corresponding query instruction according to the types of the user service data in the user service data template; and
   the determination of the user service data matching the data request condition comprises: a query instruction for the types of each user service data in the user service data template is determined, and the user service data matching the data request condition is queried through the query instruction.

26. The method according to claim 14, wherein,
   the user service data request comes from a data requestor;
   after the generation of the user service data, the method further comprises: providing the data requestor with a user service data list matching the data request condition and the user service data template; and/or,
   the method further comprises: providing the data requestor with a template identifier corresponding to the user service data template, or a user service data template and a corresponding template identifier.

\* \* \* \* \*